United States Patent [19]

Ishikawa

[11] Patent Number: 5,632,251

[45] Date of Patent: May 27, 1997

[54] ENGINE FUEL VAPOR TREATING APPARATUS

[75] Inventor: Takashi Ishikawa, Okazaki, Japan

[73] Assignee: Toyota Jidosha Kabushiki Kaisha, Toyota, Japan

[21] Appl. No.: 582,323

[22] Filed: Jan. 3, 1996

[30] Foreign Application Priority Data

Jan. 6, 1995 [JP] Japan ................ 7-000877

[51] Int. Cl.$^6$ .................................................. F02M 25/08
[52] U.S. Cl. .................................................. 123/519
[58] Field of Search ........................... 123/516, 518, 123/519, 520

[56] References Cited

U.S. PATENT DOCUMENTS

| | | | |
|---|---|---|---|
| 4,496,379 | 1/1985 | Kozawa | 123/519 |
| 4,714,172 | 12/1987 | Morris | 220/351 |
| 4,951,643 | 8/1990 | Sato et al. | 123/519 |
| 5,170,765 | 12/1992 | Hoshino et al. | 123/519 |
| 5,173,095 | 12/1992 | Yasukawa et al. | 123/519 |
| 5,337,721 | 8/1994 | Kasuya et al. | 123/519 |
| 5,355,861 | 10/1994 | Arai | 123/519 |
| 5,398,660 | 3/1995 | Koyama et al. | 123/519 |
| 5,408,976 | 4/1995 | Reddy | 123/519 |
| 5,460,136 | 10/1995 | Yamazaki et al. | 123/519 |
| 5,462,100 | 10/1995 | Covert et al. | 141/59 |
| 5,474,048 | 12/1995 | Yamazaki et al. | 123/519 |

FOREIGN PATENT DOCUMENTS

| | | |
|---|---|---|
| 55-174927 | 12/1980 | Japan . |
| 59-226263A | 12/1984 | Japan . |
| 60-100559 | 7/1985 | Japan . |
| 61-53451A | 3/1986 | Japan . |
| 63-154850A | 6/1988 | Japan . |
| 185456 | 6/1989 | Japan . |
| 674107A | 3/1994 | Japan . |

Primary Examiner—Thomas N. Moulis
Attorney, Agent, or Firm—Kenyon & Kenyon

[57] ABSTRACT

A fuel vapor treating apparatus for an engine provided with a fuel tank and a canister is disclosed. The fuel tank is communicated with the canister by a vapor line and a breather line. The canister has a partition which defines a main chamber and a sub-chamber therein. A plate provided in the sub-chamber further defines two compartments therein. The plate has a plurality of holes on its entire surface. When fuel vapor flows through the holes, fuel components suspended in the fuel vapor are adsorbed and collected by an adsorbent. The adsorbent pellets of the two compartments divided by the partition are kept from contacting each other. This suppresses diffusion of the fuel vapor between the upper and lower chambers. The total area of the holes on the plate is greater than the passage area of the breather line. Accordingly, the venting resistance of the plate is relatively low. Thus, the venting resistance inside the canister is relatively low.

21 Claims, 4 Drawing Sheets

ENGINE FUEL VAPOR TREATING APPARATUS

BACKGROUND OF THE INVENTION

1. Field of the Invention

The present invention relates generally to an apparatus for collection and treatment of engine fuel vapor in a fuel tank without emitting the vapor into the atmosphere. More particularly, it pertains to a fuel vapor treating apparatus provided with a canister, which collects fuel vapor, and a purging device for delivering the collected fuel to the intake passage of the engine.

2. Description of the Related Art

Fuel vapor treating apparatuses that are mounted on vehicles are known in the prior art. These apparatuses treat fuel vapor evaporated in fuel tanks without emitting the vapor into the atmosphere. Typically, such an apparatus is provided with a canister, which collects the fuel vapor from the fuel tank through a vapor line. The canister is filled with an adsorbent comprised of activated carbon or the like and has an opening connecting the inside of the canister with the atmosphere. A purge line, extending from the canister, is connected to an intake passage of an engine. The canister first adsorbs and collects the fuel vapor introduced by the vapor line with the adsorbent. Afterwards, the canister discharges only the residual gas, from which fuel components have been extracted, to the atmosphere. During operation of the engine, the canister purges the fuel adsorbed in the adsorbent into the intake passage through the purge line when necessary.

Japanese Unexamined Patent Publication 6-74107 discloses a fuel vapor treating apparatus. As shown in FIG. 6, the apparatus has a canister 104 provided with a partition 101, which defines a main chamber 102 and a sub-chamber 103. An adsorbent 105 occupies the chambers 102, 103. A hole 106 provided in the partition 101 connects the two chambers 102, 103 to each other and serves to regulate the flow of fluid therebetween. The main chamber 102 is connected to a fuel tank 108 by a vapor line 107. The sub-chamber 103 communicates with the atmosphere through a discharge opening 109. The main chamber 102 is connected to an intake passage 112 of the engine 111 by a purge line 110. The fuel vapor conveyed into the main chamber 102 by the vapor line 107 is first adsorbed by the adsorbent 105 and collected therein. When the concentration of the fuel components adsorbed in the adsorbent 105 becomes high in the main chamber 102, the fuel vapor is diffused in the sub-chamber 103 through the hole 106. The hole 106 which regulates the flow of fuel vapor from the main chamber 102 to the sub-chamber 103 results in less adsorption of fuel in the sub-chamber 103 than in the main chamber 102. Accordingly, only the residual gas from which fuel components have been extracted is discharged into the atmosphere from the sub-chamber 103 through the opening 109. During operation of the engine, the fuel adsorbed in the two chambers 102, 103 is purged into the intake passage 112 through the purge line 110 when necessary.

In recent years, fuel vapor escaping into the atmosphere from fuel tank filler openings during refueling has been recognized as a source of pollution. Therefore, it is necessary to appropriately treat the fuel vapor, especially since a large amount of fuel vapor escapes into the atmosphere during refueling.

U.S. Pat. No. 4,714,172 discloses an apparatus which treats fuel vapor emitted during refueling. This apparatus is provided with, in addition to the vapor line, a special breather line connected between the fuel tank and the canister. The breather line has a diameter that is larger than the diameter of the vapor line. A fuel nozzle is inserted into a filler hole of a filler pipe provided on the fuel tank. A seal provided in the filler pipe seals between the periphery of the nozzle and the filler pipe when the nozzle is inserted. Accordingly, the large amount of fuel vapor emitted from the fuel tank during refueling is conveyed to the canister through the breather line. The fuel components of the fuel vapor conveyed to the canister is collected in the adsorbent. The residual gas from which fuel components have been extracted is discharged into the atmosphere by a control valve provided in the discharge opening. The breather line is required to be opened during refueling and closed at other times. A differential pressure regulating valve provided in the breather line is opened according to a pressure increase caused by the evaporation of fuel vapor during refueling. Furthermore, the periphery of the fuel nozzle, sealed by the seal, prevents the fuel vapor from escaping into the atmosphere.

Hereafter, the process where fuel vapor evaporated during refueling is conveyed to the canister for treatment is referred to as "Onboard Refueling Vapor Recovery (ORVR) treatment" while treatment of the fuel vapor at other times is referred to as "normal treatment."

During ORVR treatment, the typical amount of fuel vapor conveyed to the canister through the breather line is approximately forty-five liters per minute. This amount is very large when compared to that during normal treatment, which is approximately one liter per minute. Therefore, a desirable canister employed for ORVR treatment is one having a small ventilation resistance. However, when a canister similar to the canister 104 disclosed in the Japanese Unexamined Patent Publication 6-74107 is employed, there is a problem with its ventilation resistance. The ventilation resistance within the canister is relatively large since the canister has a hole that has a regulating effect between the two chambers. However, a large amount of fuel vapor is conveyed to the canister during ORVR treatment. Therefore, the fuel vapor does not flow smoothly to the canister from the fuel tank. This raises the internal pressure of the fuel tank and decreases the refueling efficiency.

To prevent such a decrease in refueling efficiency, the partition may be eliminated from the canister. However, this will also eliminate the regulating effect of the hole. Without the regulating effect, the fuel vapor drawn into the canister is diffused throughout the entire adsorbent. This causes the fuel concentration to become uniform throughout the adsorbent. Accordingly, the more uniform the fuel concentration of the entire adsorbent becomes, the more difficult it is to maintain low fuel concentration adsorbent in the vicinity of the discharge opening. A high concentration of fuel in the vicinity of the opening increases the possibility that the fuel components will escape into the atmosphere through the discharge opening. Thus for ORVR treatment, it is desirable to suppress uniform diffusion of fuel vapor while maintaining a low ventilating resistance inside the canister.

SUMMARY OF THE INVENTION

Accordingly, it is a primary objective of the present invention to provide a fuel vapor treatment apparatus for an engine that suppresses uniform fuel vapor diffusion inside a canister without reducing the refueling efficiency of the fuel tank.

To achieve the foregoing and other objects and in accordance with the purpose of the invention, an apparatus for treating fuel vapor generated in a fuel tank is provided. The apparatus includes a canister which has a vapor inlet communicating with the tank, a vapor outlet communicating with an engine by way of a purge line and an air intake passage, a gas outlet communicating with the atmosphere and an adsorbent layer member which has a plurality of adsorbents. The fuel vapor is introduced to the canister through the vapor inlet. The fuel components contained in the fuel vapor is collected by the adsorbent layer member and residual gas of the fuel vapor is discharged to the atmosphere through the gas outlet. The collected fuel components are purged into the air intake passage through the vapor outlet and the purge line during an operation of the engine. The apparatus comprises a breather line for introducing the fuel vapor massively generated in the tank when the fuel is supplied to the tank; and a partition device for defining a plurality of chambers in the canister. The partition device has a plurality of holes for the communication of the chambers with each other. The adsorbent layer member is divided by the partition device into two separated layers. Each of the holes is in a shape so as to restrict the passage of the adsorbents therethrough. The breather line has an area in cross section at most identical to total areas of the holes.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A fuel vapor treating apparatus employed in a gasoline-fueled automobile according to a first embodiment of the present invention will hereafter be described with reference to the drawings.

Figure 1:
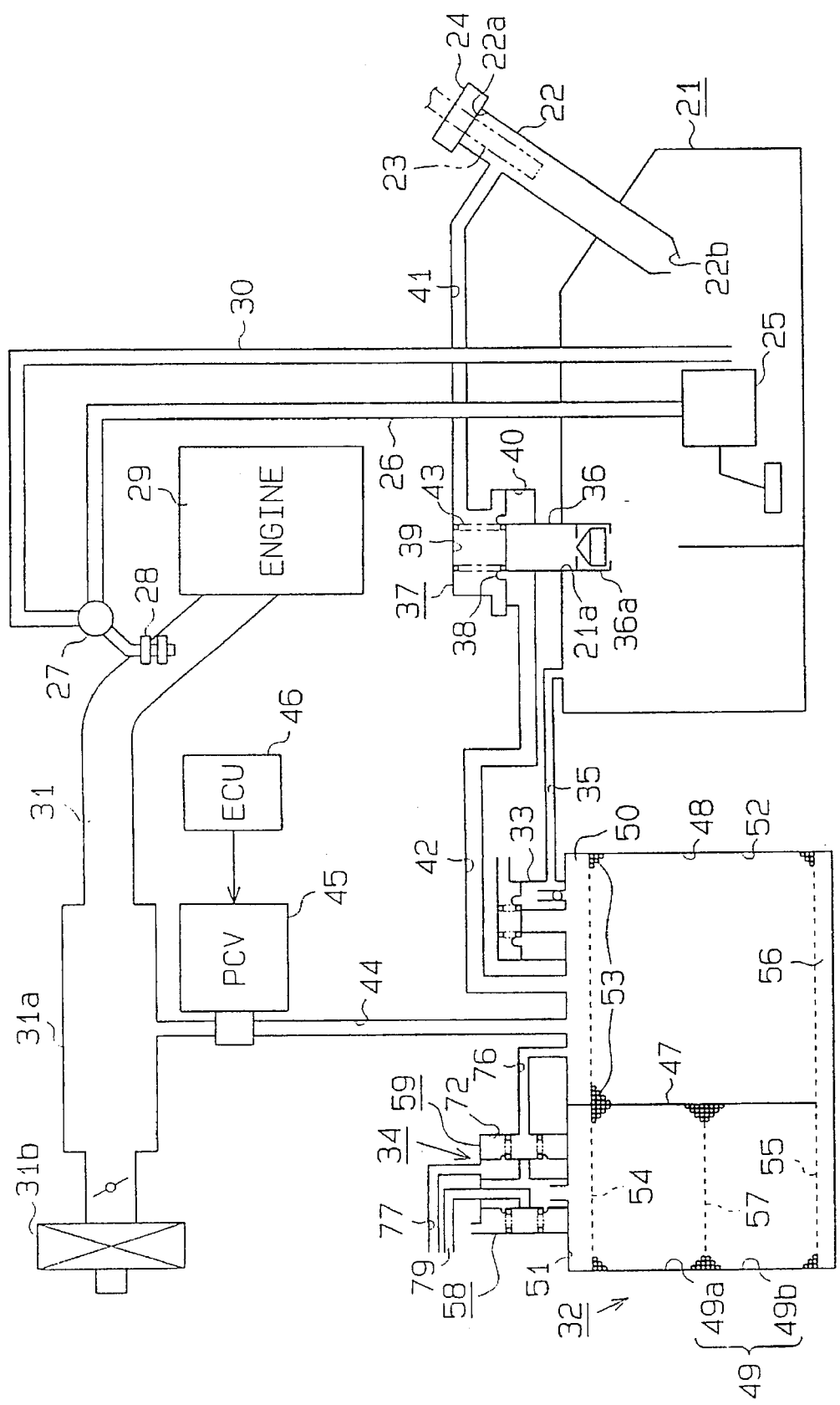
FIG. 1 is a diagrammatic drawing showing the structure of a fuel vapor treating apparatus mounted on a vehicle according to a first embodiment of the present invention.

FIG. 1 is a diagrammatic drawing showing the structure of a fuel vapor treating apparatus of the present invention. An automobile (not shown) has a gasoline engine 29 and a fuel tank 21. The tank 21 includes a filler pipe 22 for refueling. During refueling, a fuel nozzle 23 is inserted in the filler hole 22a from the outside. A removable cap 24 is attached to the filler hole 22a.

A main line 26 extending from a pump 25 in the tank 21 is connected to a delivery pipe 27. A plurality of injectors 28, provided on the pipe 27, are arranged in correspondence with the cylinders of the engine 29. A return line 30 extending from the delivery pipe 27 is connected to the tank 21. Fuel discharged from the pump 25 is sent to the delivery pipe 27 via the main line 26 and is then distributed to each injector 28 by the pipe 27. As each injector 28 is actuated to inject fuel into an intake passage 31, air is also drawn into the passage 31 through an air cleaner 31b. The fuel and air are supplied to each cylinder of the engine 29 for combustion. Surplus fuel remaining in the delivery pipe 27 is returned to the tank 21 by way of the return line 30.

The fuel vapor treating apparatus is provided with a canister 32 to collect the fuel vapor evaporated in the tank 21. The canister 32 includes a first and second control valve 33, 34. A vapor line 35 extending from the tank 21 conveys fuel vapor evaporated in the tank 21 to the canister 32. The vapor line 35 is connected to the canister 32 via the first control valve 33. The control valve 33 is opened when the internal pressure of the tank 21 reaches a predetermined value. This allows the fuel vapor in the tank 21 to be introduced into the canister 32.

A cylindrical breather pipe 36 is connected to an attaching hole 21a formed on the upper portion of the tank 21. A float valve 36a, provided at the lower portion of the pipe 36, closes the pipe 36 at the lower portion when the surface of the fuel in the tank 21 rises and reaches the valve 36a. This prevents the fuel in the tank 21 from reaching the upper portion of the pipe 36.

A differential pressure regulating valve 37 covering the breather pipe 36 is provided on the upper portion of the tank 21. The valve 37 normally closes the top end of the pipe 36 and opens it when refueling is conducted. The valve 37 includes a diaphragm type check valve, which has a diaphragm 38. The diaphragm 38 divides the inside of the valve 37, and defines upper and lower pressure chambers 39, 40, respectively. A pressure pipe 41 extending from the upper chamber 39 is connected to the filler pipe 22. A breather line 42 extending from the lower pressure chamber 40 is connected to the canister 32. A spring 43 provided in the upper pressure chamber 39 urges the diaphragm 38 downward. The breather pipe 36 is closed by this urging force when refueling is not being conducted. During refueling, the large amount of fuel vapor produced in the tank 21 raises the internal pressure therein and pushes the diaphragm 38 upward against the urging force of the spring 43 to open the top end of the breather pipe 36. This permits the fuel vapor to flow to the canister 32 through the breather line 42. The amount of fuel vapor conveyed through the breather line 42 during ORVR treatment is extremely large when compared to the amount of fuel vapor conveyed through the vapor line 35 during normal treatment. Therefore, the passage area of the breather line is about ten times larger than that of the vapor line 35.

A restriction 22b provided at the bottom end of the filler pipe 22 restricts the fuel vapor from flowing out of the filler hole 22a by way of the filler pipe 22.

A purge line 44 extending from the canister 32 is connected to a surge tank 31a, which is a part of the intake passage 31. A purge control valve (PCV) 45 provided midway in the purge line 44 controls the amount of fuel purged into the surge tank 31a. The opening of the PCV 45 is controlled by an electronic control unit (ECU) 46. By controlling the PCV 45 during operation of the engine 29, the amount of fuel purged from the canister 32 to the surge tank 31a via the purge line 44 is controlled.

Figure 2:
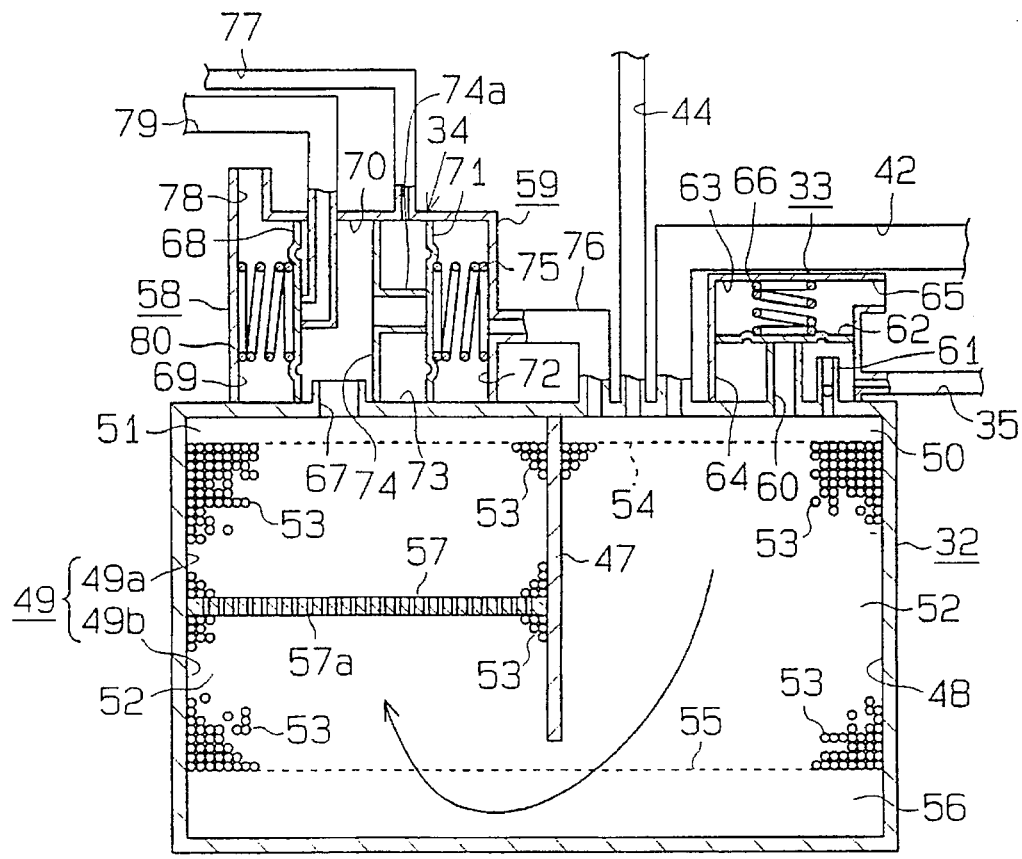
FIG. 2 is a diagrammatic cross sectional side elevation view showing the structure of a canister.

As shown in FIG. 2, a partition 47 provided in the canister 32 defines a main chamber 48 and a sub-chamber 49 therein. An adsorbent layer 52 provided in the two chambers 48, 49 includes adsorbent pellets 53 made from activated carbon. Filters 54, 55 provided on the top and bottom surfaces of the adsorbent layer 52, respectively, support the layer 52. Air layers 50, 51 provided above the filter 54 do not contain the adsorbent pellets 53. Also, a diffusing chamber 56 defined below the filter 55 does not contain the adsorbent pellets 53. The chamber 56 connects the two chambers 48, 49. A plate 57 provided in the sub-chamber 49 divides the chamber 49 into upper and lower compartments 49a, 49b, respectively.

Figure 3:
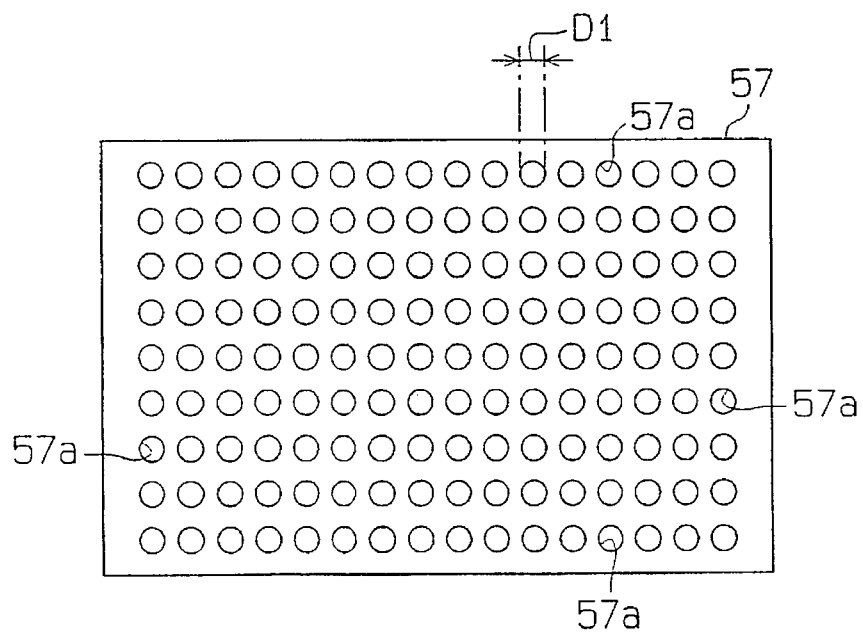
FIG. 3 is a top plan view of a plate for preventing diffusion.

As shown in FIG. 3, the plate 57 has a plurality of round holes 57a. The holes 57a are arranged on the entire plate 57 with substantially equal spacing between one another. The diameter D1 of each hole 57a is smaller than the pellet diameter of the adsorbent 53. Accordingly, the adsorbent pellets 53 do not pass through the holes 57a. Therefore, the adsorbent pellets 53 are kept from contacting one another through the holes 57a. The total area of the holes 57a is larger than the passage area of the breather line 42.

As shown in FIGS. 1 and 2, the vapor line 35 is connected to the first control valve 33, which is disposed at the upper portion of the canister 32 at a position corresponding to the main chamber 48. Two breather valves 58, 59 are provided integrally with the second control valve 34, which is disposed at the upper portion of the canister 32 at a position corresponding to the sub-chamber 49. The first breather valve 58 is opened when the internal pressure of the canister 32 becomes equal to or above a predetermined value to discharge residual gas, which fuel components have been extracted, from the canister 32 into the atmosphere. The second breather valve 59 is opened to draw in the atmospheric air into the canister 32 when fuel is purged into the surge tank 31a.

As shown in FIG. 2, an inlet port 60, which is provided at the top of the canister 32 at a position corresponding to the main chamber 48, conveys fuel vapor from the tank 21 to the canister 32. A check ball type relief valve 61 provided next to the inlet port 60 is opened when the pressure in the tank 21 becomes lower than that of the chamber 48 thus permitting flow toward the tank 21. The first control valve 33, arranged in a manner covering the inlet port 60 and the relief valve 61, includes a diaphragm type check valve having a diaphragm 62. The diaphragm 62 divides the inside of the control valve 33 to define upper and lower pressure chambers 63, 64, respectively. A breather port 65 provided in the upper pressure chamber 63 is opened to the atmosphere. The lower pressure chamber 64 is connected to the vapor line 35. A spring 66 provided in the upper chamber 63 urges the diaphragm 62 downward. The urging force closes the inlet port 60 with the diaphragm 62. When the internal pressure of the tank 21 becomes equal to or above a predetermined value, the pressure conveyed to the lower pressure chamber 64 through the vapor line 35 pushes the diaphragm 62 upward against the urging force of the spring 66 and opens the inlet port 60. The breather line 42 is connected to the top of the canister 32 at a position corresponding to the main chamber 48. The purge line 44 is also connected to the top of the canister 32 at a position corresponding to the main chamber 48 next to the location of the breather line 42.

A ventilation port 67 provided at the top of the canister 32 at a position corresponding to the sub-chamber 49 is covered by the second control valve 34. The first breather valve 58, which constitutes the control valve 34, is a diaphragm type check valve with a diaphragm 68. The diaphragm 68 divides the inside of the breather valve 58 and defines left and right pressure chambers 69, 70, respectively. The second breather valve 59 is also a diaphragm type check valve with a diaphragm 71. A partition 74 is located in the space between the two diaphragms 68, 71. The diaphragm 71 defines two pressure chambers 72, 73. A ventilation port 74a formed in the partition 74 is closed by the diaphragm 71. A spring 75 provided in the pressure chamber 72 urges the diaphragm 71 toward the ventilation port 74a and thus closes it. A pressure passage 76 extending from the pressure chamber 72 is communicated with the main chamber 48. An inlet pipe 77 is connected to the pressure chamber 73 to connect the pressure chamber 73 with the atmosphere. When fuel is purged into the surge tank 31a from the canister 32, a predetermined pressure difference between the negative pressure acting in the pressure chamber 72 via the pressure passage 76 and the atmospheric pressure acting in the pressure chamber 73 via the inlet pipe 77 displaces the diaphragm 71 against the urging force of the spring 75 and opens the ventilation port 74a. This introduces atmospheric air into the canister 32 via the inlet pipe 77 and the ventilation ports 74a, 67.

A port 78 provided in the first breather valve 58 is constantly opened to the atmosphere. An outlet pipe 79 is connected to the pressure chamber 70. A spring 80 in the pressure chamber 69 urges the diaphragm 68 toward the direction closing the outlet pipe 79. During ORVR treatment, the fuel components suspended in the fuel vapor drawn into the canister 32 are adsorbed by the adsorbent layer 52. The residual gas displaces the diaphragm 68 against the urging force of the spring 80 to open the outlet pipe 79. This allows the gas in the canister 32 to be discharged into the atmosphere via the ventilation port 67 and the outlet pipe 79. For smooth ORVR treatment, the passage area of the outlet pipe 79 and the passage area of the breather line 42 are formed having substantially the same size. The first breather valve 58 is closed until the internal pressure of the canister 32 becomes equal to or above a predetermined value.

The operation of the fuel vapor treatment apparatus constructed in the above manner will now be described. When fuel vapor evaporates in the tank 21 and thus raises the internal pressure therein to or above a predetermined value, the first control valve 33 provided in the canister 32 is opened. This draws the fuel vapor evaporated in the tank 21 into the main chamber 52 of the canister 32 through the vapor line 35.

The fuel vapor drawn into the main chamber 52 is then conveyed to the adsorbent layer 52 via the air layer 50 and the filter 54. A portion of the fuel components in the fuel vapor are collected by the adsorbent 53. The remaining fuel vapor is then introduced into the diffusing chamber 56 through the filter 55 located below the main chamber 48. The fuel vapor in the diffusing chamber 56 is then introduced into the lower compartment 49b of the sub-chamber 49 to collect the fuel components that were not collected by the adsorbent layer 52 in the main chamber 48. Afterward, the fuel vapor passes through the holes 57a of the plate 57 and enters the upper compartment 49a to enable further collection of fuel components by the adsorbent 53. The residual gas, from which fuel components have been collected by the adsorbent 53 in the sub-chamber 49, opens the first breather valve 58 of the second control valve 34 and is discharged into the atmosphere from the outlet pipe 79. During the discharge, the force of the internal pressure of the pressure chamber 72 for the second valve 59 is higher than that of the pressure chamber 73 and the spring 75 closes the valve 59. Accordingly, fuel vapor does not escape into the atmosphere through the inlet pipe 77.

The fuel components of the fuel vapor are gradually collected by the adsorbent 53 as the vapor passes through the adsorbent layers 52 of the main chamber 48 and the sub-chamber 49. As the fuel components are collected, the fuel vapor moves in a U-shaped manner as indicated by the arrow shown in FIG. 2. This lengthens the travel distance of the fuel vapor and extends the period of time which the vapor are in contact with the adsorbent 53. As a result, the fuel components suspended in the fuel vapor are efficiently adsorbed by the adsorbent 53.

When the automobile is parked over a long period of time, evaporation of fuel vapor in the tank 21 stops. This causes the internal pressure of the tank 21 to become relatively low compared to that of the canister 32, and the pressure in the pressure chamber 64 of the first control valve 33 to become relatively low. As a result, the relief valve 61 is opened. This allows gas to flow from the canister 32 to the tank 21 by way of the vapor line 35.

When the engine 29 is started, a negative pressure is produced in the intake passage 31, which includes the surge tank 31a. The ECU 46 then opens the PCV 45 and communicates the negative pressure to the canister 32 via the purge line 44. This opens the second breather valve 59 of the second control valve 34 and draws atmospheric air into the canister 32 via the inlet pipe 77. The fuel components adsorbed in the adsorbent 53 are then separated from the adsorbent 53 by the atmospheric air and are mixed with the air.

The gas with the fuel components suspended therein is conveyed to the purge line 44 and purged into the surge tank 31a via the PCV 45. The purged fuel components are mixed with the ambient air that has passed through the air cleaner 31b and are then sent to the engine 29. This gas is then supplied to each cylinder of the engine 29 together with the fuel injected by the injectors 28 for combustion.

The ORVR treatment is performed during refueling. The cap 24 is removed from the filler pipe 22 to insert the fuel nozzle 23 therein for refueling. During refueling, atmospheric pressure acts on the pressure chamber 39 of the pressure regulating valve 37 via the pressure pipe 41. During refueling, the liquid surface of the fuel inside the tank 21 rises while a large amount of fuel vapor increases the internal pressure of the tank 21. When the internal pressure of the tank 21 reaches or exceeds the predetermined value, the diaphragm 38 is displaced upward against the internal pressure of the pressure chamber 39 (atmospheric pressure) in the regulating valve 37 and the urging force of the spring 43 and thus opens the valve 37. This results in the fuel vapor in the tank 21 flowing into the breather line 42 via the valve 37. The fuel vapor then further flows into the main chamber 48 of the canister 32.

During the ORVR treatment, the process in which fuel components are collected in the canister 32 and the process in which they are purged are performed in the same manner as with the normal treatment. These processes will not be described below.

The amount of fuel vapor moving through the canister 32 during ORVR treatment is extremely large when compared to that during the normal treatment. The plate 57 provided in the canister 32 tends to increase the resistance of flow of fuel vapor therein.

However, in the present embodiment, the plate 57 has a plurality of holes 57a. The total area of the holes 57a is equal to or above the total passage area of the breather line 42. Accordingly, the flow resistance created by the plate 57 is rather low. Thus the fuel vapor flows from the tank 21 to the canister 32 without interference. This enables the large amount of fuel vapor produced during refueling to be readily discharged into the breather line 42 from the tank 21 in response to an increase in the internal pressure of the tank 21. As a result, refueling of the tank 21 is not impeded by the tank's internal pressure. This prevents a decrease in refueling efficiency.

Furthermore, the adsorbent 53 contained in the sub-chamber 49 is partitioned by the plate 57. Fuel vapor flow between the upper and lower compartments 49a, 49b through the holes 57a of the plate 57. However, movement of the adsorbent pellets 53 between the two compartments 49a, 49b by way of the holes 57a is prevented since the diameter D1 of each hole 57a is smaller than the pellet diameter of the adsorbent 53. Contact between the adsorbent pellets 53 in the two compartments 49a, 49b by way of the holes 57a is also prevented. Accordingly, uniform diffusion of fuel vapor, which may be caused by contact between the adsorbent pellets 53 of each compartment 49a, 49b, is prevented.

Since diffusion of the fuel vapor flowing toward the upper compartment 49a from the lower compartment 49b is suppressed, the concentration of fuel adsorbed in the adsorbent 53 of the compartment 49a is maintained at a value lower than the concentration of fuel adsorbed in the adsorbent 53 of the compartment 49b. In other words, the amount of fuel adsorbed in the adsorbent pellets 53 of the upper compartment 49a is always smaller than the amount of the fuel components adsorbed in the adsorbent pellets 53 of the lower compartment 49b and the main chamber 48. Accordingly, gas from which fuel components have sufficiently been collected is discharged into the atmosphere through the first breather valve 58.

In the present embodiment, the holes 57a are defined throughout the entire surface of the plate 57. Therefore, there are no sections in the vicinity of the plate 57 where fuel vapor does not permeate through the adsorbent pellets 53. This enables efficient use of the entire adsorbent layer 52 next to the plate 57.

In addition, the partitioning of the sub-chamber 49 suppresses movement of the adsorbent pellets 53 therein. Therefore, strong vibrations of the absorbent 53 caused by the vibrations of the vehicle is prevented. This prevents powdering of the adsorbent pellets 53 caused by pellets abrading one another.

A second embodiment according to the present invention will now be described with reference to the drawings. Members which are identical to those in the first embodiment will be denoted with the same numerals. Description of these members will not be given. The description will center on the differences from the first embodiment.

Figure 4:
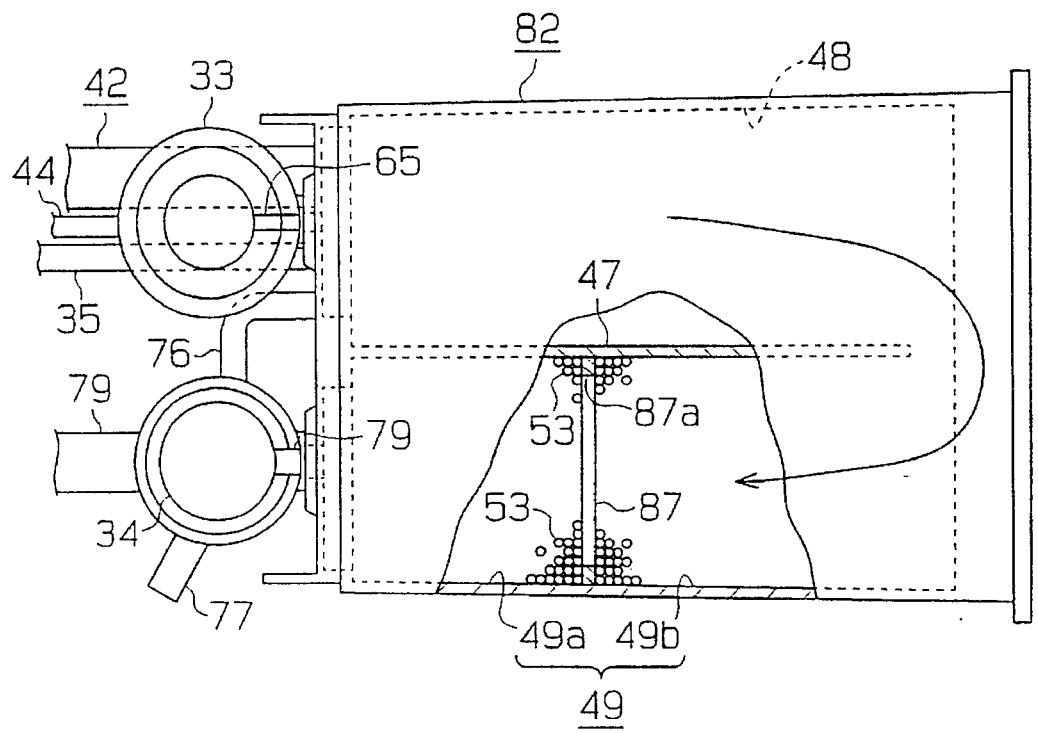
FIG. 4 is a partially cutaway diagrammatic side elevation view showing the structure of a canister according to a second embodiment of the present invention.
Figure 5:
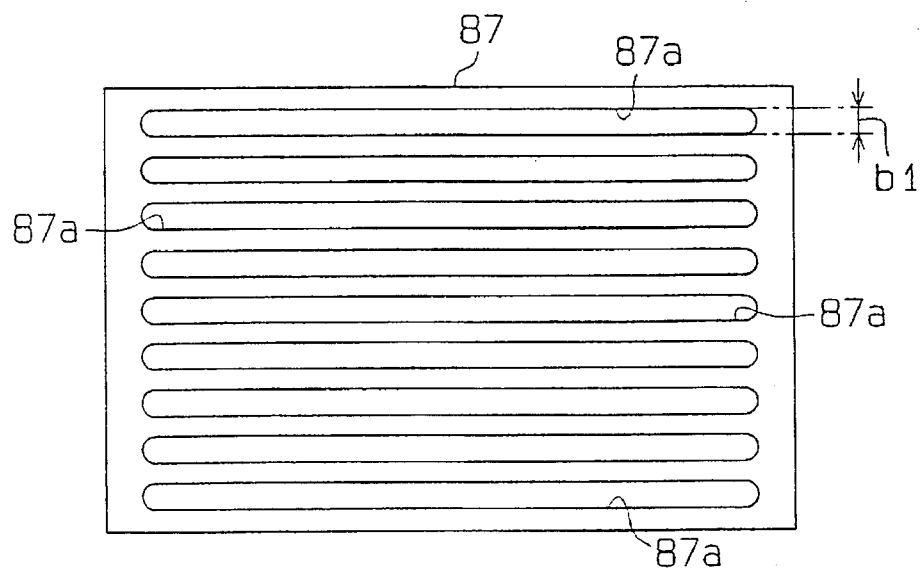
FIG. 5 is a top plan view of a plate for preventing diffusion.
Figure 6:
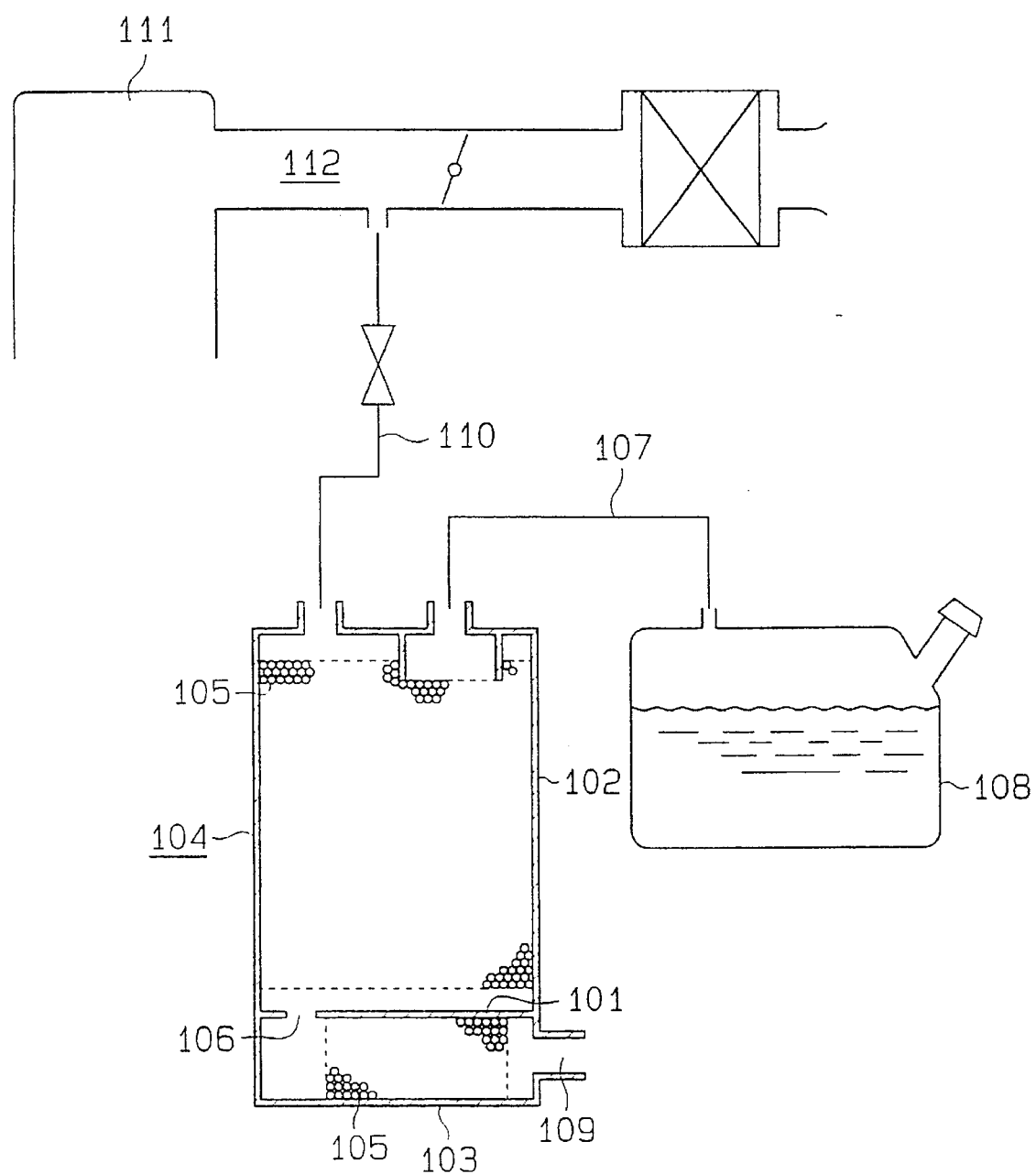
FIG. 6 is a diagrammatic drawing showing a prior art fuel vapor treating apparatus.

As shown in FIG. 4, a canister 82 is oriented ninety degrees from the canister 32 of the first embodiment. In other words, the canister 82 is a side-floater type canister in which fuel vapor flows horizontally as indicated by the arrow shown in FIG. 4. As shown in FIG. 4, the first and second control valves 33 are located one above the other at the left side of the canister 82. As shown in FIG. 5, a plate 87 of this embodiment is provided with a plurality of elongated holes 87a. The holes 87a are arranged parallel to one another with substantially equal spacing therebetween on the entire surface of plate 87. The minimum width b1 of each hole 87a is smaller than the pellet diameter of the adsorbent 53 contained in the canister 82. This prevents movement of the adsorbent pellets 53 between the compartment 49a on the left side of FIG. 4 and the compartment 49b on the right side through the holes 87a. It also prevents contact between the adsorbent pellets 53 of the two compartments 49a, 49b through the holes 87a. The total area of all holes 87a is equal to or larger than the passage area of the breather line 42.

In this embodiment, it is possible to increase the total area of the holes 87a by elongating the holes 87a without allowing contact between the adsorbent pellets 53 in the compartments 49a, 49b. In other words, it is possible to efficiently use the adsorbing performance of the adsorbent pellets 53 and minimize the flow resistance of the plate 87.

Generally, the amount of fuel vapor treated during the ORVR treatment is greater than at other times. Accordingly, the venting resistance and the adsorbing capacity of a canister capable of ORVR treatment is greater than that of a canister which does not perform ORVR treatment. A canister with a small adsorbing capacity is not capable of sufficiently collecting the fuel components from the large amount of fuel vapor generated during ORVR treatment.

However, with the canister 82 of this embodiment, the performance of the adsorbent 53 is efficient and the venting resistance therein is reduced to a low value. Accordingly, it is possible to manufacture a more compact canister 82. In addition, the structure of the side-flow type canister 82 reduces its height. Thus, the canister 82 has an advantage when mounting space is restricted.

Although only two embodiments of the present invention have been described herein, it should be apparent to those skilled in the art that the present invention may be embodied in many other specific forms without departing from the spirit or scope of the invention. Particularly, it should be understood that the present invention may be modified in the manners described below.

In each of the previous embodiments, only one plate 57, 58 was used. However, a plurality of plates may be used as long as the refueling efficiency is not degraded. With this structure, it is possible to increase the adsorbing amount of the adsorbent pellets 53 while suppressing the diffusion of the fuel vapor.

The plates 57, 87 in each of the previous embodiments may be made from a material having high specific heat to absorb the heat produced when the fuel components of the fuel vapor are adsorbed by the adsorbent pellets 53. This would improve the adsorbing performance of the adsorbent pellets 53.

In each of the above embodiments, the flow amount of fuel vapor in the vicinity of the inner walls of the canisters 32, 82 is small. As a result, the adsorbent 53 at these sections is not efficiently used. To solve this problem, the holes 57a, 87a at the peripheral sections of the plate 57, 87 may be formed having diameters larger than the holes 57a, 87a formed at the center section. This will allow the flow amount of fuel vapor to be equal on the entire plate 57, 87 and enable efficient use of all the adsorbent pellets 53.

In the previous embodiments, the holes 57a, 87a are formed with substantially equal intervals between each other. However, the holes 57a, 87a may be concentrated at the peripheral sections of the plate 57, 87 and scattered at the center section. This structure will also enable efficient use of all the adsorbent pellets 53.

Therefore, the present examples and embodiments are to be considered as illustrative and not restrictive and the invention is not to be limited to the details given herein, but may be modified within the scope of the appended claims.

What is claimed is:

1. An apparatus for treating fuel vapor generated in a fuel tank, said apparatus having a canister which has a vapor inlet communicating with the tank, a vapor outlet communicating with an engine by way of a purge line and an air intake passage, a gas outlet communicating with the atmosphere and an adsorbent layer member which has a plurality of adsorbents, wherein the fuel vapor is introduced to the canister through the vapor inlet, fuel components contained in the fuel vapor are collected by the adsorbent layer member and residual gas of the fuel vapor is discharged to the atmosphere through the gas outlet, and wherein the collected fuel components are purged into the air intake passage through the vapor outlet and the purge line during an operation of the engine, said apparatus comprising:

a breather line for introducing the fuel vapor massively generated in the tank when the fuel is supplied to the tank;

a partition means for defining a plurality of chambers in the canister;

said partition means having a plurality of holes for the communication of the chambers with each other;

said adsorbent layer member being divided by the partition means into two separated layers;

each of said holes being in a shape so as to restrict the passage of the adsorbents therethrough; and said breather line having an area in cross section at most identical to the total area of the holes.

2. The apparatus as set forth in claim 1, wherein said plurality of holes are provided throughout the partition means.

3. The apparatus as set forth in claim 2, wherein said partition means has a plate horizontally extending to divide the adsorbent layer member into an upper layer and a lower layer.

4. The apparatus as set forth in claim 1 further comprising a first valve selectively opened and closed by a difference between inner pressure of the tank and the atmosphere, said first valve being arranged to be open to lead the fuel vapor to the breather line from the tank when the fuel is supplied to the tank.

5. The apparatus as set forth in claim 4 further comprising a second valve for selectively opening and closing the purge line, said second valve being arranged to be open when necessary during the operation of the engine and to be closed when the fuel is supplied to the tank.

6. The apparatus as set forth in claim 1 wherein said partition means further includes:

a first plate vertically extending to divide the adsorbent layer means into a first layer and a second layer; and a second plate horizontally extending to divide the first layer into a pair of relatively thin layers disposed one above another, said second plate having the plurality of the holes.

7. The apparatus as set forth in claim 1 further comprising a vapor line for introducing the fuel vapor to the canister when the tank is not being supplied with fuel.

8. An apparatus for treating fuel vapor generated in a fuel tank, said apparatus having a canister which has a vapor inlet communicating with the tank, a vapor outlet communicating with an engine by way of a purge line and an air intake passage, a gas outlet communicating with the atmosphere and an adsorbent layer member which has a plurality of adsorbents, wherein the fuel vapor is introduced to the canister through the vapor inlet, fuel components contained in the fuel vapor are collected by the adsorbent layer member and residual gas of the fuel vapor is discharged to the atmosphere through the gas outlet, and wherein the collected fuel components are purged into the air intake passage through the vapor outlet and the purge line during an operation of the engine, said apparatus comprising:

a breather line for introducing the fuel vapor massively generated in the tank when the fuel is supplied to the tank;

a partition means for defining a plurality of chambers in the canister;

said partition means having a plurality of holes for the communication of the chambers with each other;

said adsorbent layer member being divided by the partition means into two separated layers;

each of said holes having an inner diameter smaller than a smallest diameter of the adsorbents; and said breather line having an area in cross section at most identical to the total area of the holes.

9. The apparatus as set forth in claim 8, wherein said plurality of holes are provided throughout the partition means.

10. The apparatus as set forth in claim 9, wherein said partition means has a plate horizontally extending to divide the adsorbent layer member into an upper layer and a lower layer.

11. The apparatus as set forth in claim 8 further comprising a first valve selectively opened and closed by a difference between inner pressure of the tank and the atmosphere, said first valve being arranged to be open to lead the fuel vapor to the breather line from the tank when the fuel is supplied to the tank.

12. The apparatus as set forth in claim 11 further comprising a second valve for selectively opening and closing the purge line, said second valve being arranged to be open when necessary during the operation of the engine and to be closed when the fuel is supplied to the tank.

13. The apparatus as set forth in claim 8 wherein said partition means further includes:

a first plate vertically extending to divide the adsorbent layer means into a first layer and a second layer; and a second plate horizontally extending to divide the first layer into a pair of relatively thin layers disposed one above another, said second plate having the plurality of the holes.

14. The apparatus as set forth in claim 8 further comprising a vapor line for introducing the fuel vapor to the canister when the tank is not being supplied with fuel.

15. An apparatus for treating fuel vapor generated in a fuel tank, said apparatus having a canister which has a vapor inlet communicating with the tank, a vapor outlet communicating with an engine by way of a purge line and an air intake passage, a gas outlet communicating with the atmosphere and an adsorbent layer member which has a plurality of adsorbents, wherein the fuel vapor is introduced to the canister through the vapor inlet, fuel components contained in the fuel vapor are collected by the adsorbent layer member and residual gas of the fuel vapor is discharged to the atmosphere through the gas outlet, and wherein the collected fuel components are purged into the air intake passage through the vapor outlet and the purge line during an operation of the engine, said apparatus comprising:

a breather line for introducing the fuel vapor massively generated in the tank when the fuel is supplied to the tank;

a partition means for defining a plurality of chambers in the canister;

said partition means having a plurality of holes for the communication of the chambers with each other;

said adsorbent layer member being divided by the partition means into two separated layers;

each of said holes being formed in an elliptical shape having a minor axis smaller than a smallest diameter of the adsorbents and a major axis substantially equal to a length of the partition means; and said breather line having an area in cross section at most identical to the total area of the holes.

16. The apparatus as set forth in claim 15, wherein said plurality of holes are provided throughout the partition means.

17. The apparatus as set forth in claim 16, wherein said partition means has a plate horizontally extending to divide the adsorbent layer member into an upper layer and a lower layer.

18. The apparatus as set forth in claim 15 further comprising a first valve selectively opened and closed by a difference between inner pressure of the tank and the atmosphere, said first valve being arranged to be open to lead the fuel vapor to the breather line from the tank when the fuel is supplied to the tank.

19. The apparatus as set forth in claim 18 further comprising a second valve for selectively opening and closing the purge line, said second valve being arranged to be open when necessary during the operation of the engine and to be closed when the fuel is supplied to the tank.

20. The apparatus as set forth in claim 15 wherein said partition means further includes:

a first plate vertically extending to divide the adsorbent layer means into a first layer and a second layer; and a second plate horizontally extending to divide the first layer into a pair of relatively thin layers disposed one above another, said second plate having the plurality of the holes.

21. The apparatus as set forth in claim 15 further comprising a vapor line for introducing the fuel vapor to the canister when the tank is not being supplied with fuel.

* * * * *